(12) United States Patent
Hirvonen et al.

(10) Patent No.: US 11,195,511 B2
(45) Date of Patent: Dec. 7, 2021

(54) METHOD AND SYSTEM FOR CREATING OBJECT-BASED AUDIO CONTENT

(71) Applicants: DOLBY INTERNATIONAL AB, Amsterdam Zuidoost (NL); DOLBY LABORATORIES LICENSING CORPORATION, San Francisco, CA (US)

(72) Inventors: Toni Hirvonen, Helsinki (FI); Daniel Arteaga, Barcelona (ES); Eduard Aylon Pla, Barcelona (ES); Alex Cabrer Manning, Barcelona (ES); Lie Lu, Dublin, CA (US); Karl Jonas Roeden, Solna (SE)

(73) Assignees: Dolby Laboratories Licensing Corporation, San Francisco, CA (US); Dolby International AB, Amsterdam Zuidoost (NL)

( * ) Notice: Subject to any disclaimer, the term of this patent is extended or adjusted under 35 U.S.C. 154(b) by 0 days.

(21) Appl. No.: 17/260,569

(22) PCT Filed: Jul. 17, 2019

(86) PCT No.: PCT/US2019/004229
§ 371 (c)(1),
(2) Date: Jan. 15, 2021

(87) PCT Pub. No.: WO2020/018724
PCT Pub. Date: Jan. 23, 2020

(65) Prior Publication Data
US 2021/0295820 A1 Sep. 23, 2021

Related U.S. Application Data

(60) Provisional application No. 62/737,330, filed on Sep. 27, 2018.

(30) Foreign Application Priority Data

Jul. 19, 2018 (ES) .............................. ES201830728
Oct. 19, 2018 (EP) ...................................... 8201444

(51) Int. Cl.
*G10L 13/10* (2013.01)
*H04S 7/00* (2006.01)

(52) U.S. Cl.
CPC ................ *G10L 13/10* (2013.01); *H04S 7/00* (2013.01); *H04S 2400/01* (2013.01); *H04S 2420/11* (2013.01)

(58) Field of Classification Search
CPC ..... H04S 7/00; H04S 2400/01; H04S 2420/11
See application file for complete search history.

(56) References Cited

U.S. PATENT DOCUMENTS 5,561,736 A * 10/1996 Moore .................... G10L 13/02
704/260
6,446,040 B1 * 9/2002 Socher .................. G10L 13/027
704/260
(Continued)

FOREIGN PATENT DOCUMENTS

EP 3276623 1/2018
WO 99/66496 12/1999
(Continued)

*Primary Examiner* — Sonia L Gay (57) ABSTRACT

Described herein is a method for creating object-based audio content from a text input for use in audio books and/or audio play, the method including the steps of: a) receiving the text input; b) performing a semantic analysis of the received text input; c) synthesizing speech and effects based on one or more results of the semantic analysis to generate one or more audio objects; d) generating metadata for the one or more audio objects; and e) creating the object-based audio content including the one or more audio objects and the metadata. Described herein are further a computer-based system
(Continued)

including one or more processors configured to perform said method and a computer program product comprising a computer-readable storage medium with instructions adapted to carry out said method when executed by a device having processing capability.

15 Claims, 3 Drawing Sheets

(56) References Cited

U.S. PATENT DOCUMENTS

| | | |
|---|---|---|
| 9,183,831 B2 | 11/2015 | Byron |
| 2004/0107101 A1 | 6/2004 | Eide |
| 2011/0046943 A1 | 2/2011 | Lee |
| 2015/0039302 A1 | 2/2015 | Jarvinen |
| 2016/0093289 A1 | 3/2016 | Pollet |
| 2016/0266654 A1 | 9/2016 | Lehtiniemi |
| 2017/0169811 A1 | 6/2017 | Sabbavarapu |
| 2021/0158795 A1* | 5/2021 | Liu .................... G06F 40/30 |

FOREIGN PATENT DOCUMENTS

| | | |
|---|---|---|
| WO | 2012104119 A1 | 8/2012 |
| WO | 2015027327 A1 | 3/2015 |
| WO | 2017109759 | 6/2017 |

* cited by examiner

METHOD AND SYSTEM FOR CREATING OBJECT-BASED AUDIO CONTENT

CROSS-REFERENCE TO RELATED APPLICATIONS

This application claims the benefit of priority from Spanish Patent Application No. P201830728 filed Jul. 19, 2018; United States Provisional Patent Application No. 62/737,330 filed Sep. 27, 2018 and European Patent Application No. 18201444.9 filed Oct. 19, 2018, which are hereby incorporated by reference in their entirety.

TECHNOLOGY

The present disclosure relates generally to a method for creating object-based audio content for use in audio books and/or audio play based on text input, and more specifically to creating object-based audio content based on a deeper semantic analysis of the text input.

While some embodiments will be described herein with particular reference to that disclosure, it will be appreciated that the present disclosure is not limited to such a field of use and is applicable in broader contexts.

BACKGROUND

Any discussion of the background art throughout the disclosure should in no way be considered as an admission that such art is widely known or forms part of common general knowledge in the field.

Nowadays, audio books and audio play provide experiencing literature beyond the mere written word. The conversion of text to speech for playback in audio books and audio play is well-recognized and subject to constant development. Making synthesized speech sound more natural and more emotional is but one goal to be reached.

US 2017/0169811 A1 discloses, for example, a system and method for performing text-to-speech (TTS) processing of textual works, such as literary works. The text of these works is processed and offsets corresponding to one or more of chapters, paragraphs, sentences, words, section of dialogues and sections of other context are determined. Using these offsets, it is further determined which portion of a work and how much of a work is to be processed using TTS processing at a time to produce a high-quality audio output. This audio output may then be sent to a user device and played on said device.

US 2016/0093289 A1 discloses, for example, techniques for performing multi-style speech synthesis. These techniques include obtaining input comprising text and an identification of a first speaking style for use in rendering the text as speech. A plurality of speech segments for use in rendering the text as speech are further identified, the identified plurality of speech segments comprising a first speech segment having the first speaking style and a second speech segment having a second speaking style different from the first speaking style. The text is then rendered as speech having the first speaking style, at least in part, by using the identified plurality of speech segments.

Besides making synthesized speech sound more natural and more emotional, creating even deeper experience of emotions has also been attempted to improve the listening experience of a user.

EP 3 276 623 A1 discloses, for example, a method of automatically generating a digital soundtrack intended for synchronized playback with the reading of an associated text. The method comprises syntactically and/or semantically analyzing the text at a segment level to generate an emotional profile for each text segment in the context of a continuous emotion model. A respective soundtrack is then generated for the text regions that are selected for playback.

Traditionally, audio content is created and stored in channel-based formats. As used herein, the term "audio channel" or "channel" refers to the audio content that usually has a predefined physical location. For example, stereo, surround 5.1, surround 7.1 and the like are all channel-based formats for audio content. Recently, with the development in the multimedia industry, three-dimensional (3D) audio content is getting more and more popular in particular in the cinema and at home.

As used herein, the term "audio object" refers to an individual audio element that exists for a defined duration of time in the sound field. An audio object may be dynamic or static. Optionally, the audio objects may have associated metadata, such as the spatial information describing the position, velocity, and the size of an object. Object-based audio content has been developed to provide an improved 3D listening experience. Sound designers and artists are free to mix audio in a 3D space, steering effects through surround channels and adding seamless overhead dimension with height channels.

While already extensively applied in the area of home theatres and cinemas, it would be desirable to provide the benefits of object-based audio content also for users listening to audio books and/or audio play. It is thus an object to provide a method, a system and a computer program product for providing a user with an immersive listening experience while listening to an audio book or audio play.

SUMMARY

In accordance with a first aspect of the present disclosure there is provided a method for creating object-based audio content from a text input for use in audio books and/or audio play. The method may include the step of: a) receiving the text input. The method may further include the step of: b) performing a semantic analysis of the received text input. The method may further include the step of: c) synthesizing speech and effects based on one or more results of the semantic analysis to generate one or more audio objects. The method may further include the step of: d) generating metadata for the one or more audio objects. And the method may further include the step of: e) creating the object-based audio content including the one or more audio objects and the metadata.

In one embodiment the method may further include the step: bi) identifying, as the one or more results of the semantic analysis, one or more origins of speech and effects. By identifying the one or more origins of speech and effects, the one or more audio objects may be generated in relation to the one or more origins of speech and effects.

In one embodiment the method may further include the step: bii) determining, as the one or more results of the semantic analysis, speech information and effects information. The speech information and the effects information may be used to guide the synthesis of speech and effects. If one or more origins of speech and effects are identified, the speech information and the effects information may be determined in relation to the one or more origins of speech and effects.

In one embodiment the method may further include the step: biii) determining, as the one or more results of the semantic analysis, spatial information. By determining the spatial information, the metadata may be generated based on the spatial information. If one or more origins of speech and effects are identified, the spatial information may be determined relating to the one or more origins of speech and effects.

For example, in one embodiment the method for creating object-based audio content from a text input for use in audio books and/or audio play may include the step of receiving the text input. The method may further include the step of performing a semantic analysis of the received text input. The method may further include the step of identifying one or more origins of speech and effects based on the semantic analysis. The method may further include the step of determining speech information and effects information based on the semantic analysis. The method may further include the step of determining spatial information for the one or more origins based on the semantic analysis. The method may further include the step of synthesizing speech and effects based on the speech information and the effects information to generate one or more audio objects related to the one or more origins of speech and effects. The method may further include the step of generating metadata for the one or more audio objects based on the spatial information. The method may yet further include the step of creating the object-based audio content including the one or more audio objects and the metadata.

In one embodiment the method may further include step: ai) normalizing the received text input. By performing normalization, the received text input may be converted to a standard text, for example, by converting numbers, abbreviations and/or symbols to their equivalent of written words. Accordingly, standard text may be analyzed more efficiently in step b).

In one embodiment the method may further include the step: aii) performing a syntactic analysis of the received text input. By performing the syntactic analysis, the structure of the received text input may be obtained. Accordingly, knowledge of the text structure may allow a more efficient segmentation of the received text input and thus a more efficient semantic analysis.

In one embodiment the semantic analysis may include segmentation of the received text input. By applying segmentation, the received text input may be separated into segments of a desired size, for example, words, sentences or paragraphs. Accordingly, in the semantic analysis each segment may be analyzed individually allowing also for determination of context by analyzing one or more neighboring segments.

In one embodiment the semantic analysis may include a sentiment analysis. The sentiment analysis may be rule-based. The sentiment analysis may also be guided by keywords. Accordingly, the one or more results of the semantic analysis may thus be determined in an efficient and precise way by analyzing the meaning underlying the received text input.

In one embodiment the semantic analysis may include natural language processing with machine learning (as for example deep learning). Accordingly, an even deeper understanding of the meaning underlying the received text input may thus be achieved.

In one embodiment the origins of speech and effects may include one or more of actors, a narrator, items and ambience.

In one embodiment the speech information may include information on one or more of name, gender, characteristics of one or more actors and background of the one or more actors.

In one embodiment the speech may be synthesized using text to speech synthesis. The text to speech synthesis may include unit selection speech synthesis.

In one embodiment the speech synthesis may include the synthesis of one or more of style, prosody and voice.

In one embodiment the speech synthesis may include the synthesis of emotional speech.

In one embodiment the speech information may further include emotional information as the one or more results of the semantic analysis. The emotional information may be used to guide the synthesis of emotional speech. The emotional information may include at least information on happiness, sadness, anger and neutrality.

In one embodiment the effects information may include information on one or more of noise, music, ambient sounds and item specific sounds.

In one embodiment the spatial information may include information on one or more of direction of travel, velocity, size, shape, position, coherence and/or acceleration. Accordingly, the spatial information may enable to provide an immersive listening experience to a user during playback of an audio book or audio play.

In one embodiment the method may further include introducing additional recordings and/or effects.

In one embodiment the method may further include the step: f) encoding the object-based audio content.

In accordance with a second aspect of the present disclosure there is provided a method for creating object-based audio content from a text input for use in audio books and/or audio play. The method may include the step of: a) receiving the text input. The method may further include the step of: b) performing a semantic analysis of the received text input. The method may further include the step of: c) synthesizing speech and effects based on one or more results of the semantic analysis to generate one or more audio objects. The method may further include the step of: d) generating metadata for the one or more audio objects. The method may further include the step of: e) creating the object-based audio content including the one or more audio objects and the metadata. And the method may further include the step of: f) rendering the object-based audio content to a channel-based format.

In one embodiment the method may further include the step: bi) identifying, as the one or more results of the semantic analysis, one or more origins of speech and effects.

In one embodiment the method may further include the step: bii) determining, as the one or more results of the semantic analysis, speech information and effects information.

In one embodiment the method may further include the step: biii) determining, as the one or more results of the semantic analysis, spatial information.

In one embodiment the channel-based format may include 5.1, 7.1, 7.1.4, B-Format, Ambisonics, stereo and binaural.

In one embodiment the method may further include the step: ai) normalizing the received text input.

In one embodiment the method may further include the step: aii) performing a syntactic analysis of the received text input.

In one embodiment the method may further include introducing additional recordings and/or effects.

According to another aspect of the present disclosure there is provided a computer-based system including one or more processors configured to perform a method for creating object-based audio content from a text input for use in audio books and/or audio play.

In one embodiment the computer-based system may include a user interface to facilitate the selection of text input.

According to yet another aspect of the present disclosure there is provided a computer program product comprising a computer-readable storage medium with instructions adapted to carry out a method for creating object-based audio content from a text input for use in audio books and/or audio play when executed by a device having processing capability.

BRIEF DESCRIPTION OF THE DRAWINGS

Example embodiments of the disclosure will now be described, by way of example only, with reference to the accompanying drawings in which.

DESCRIPTION OF EXAMPLE EMBODIMENTS

Overview

Figure 1:
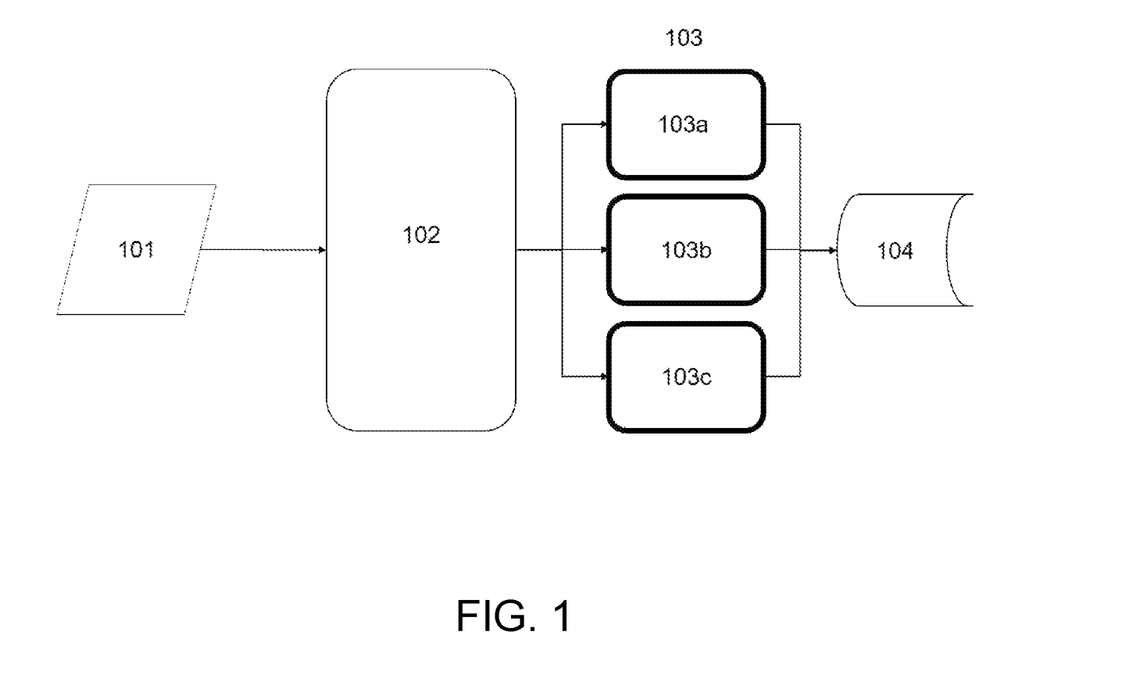
FIG. 1 illustrates a flow diagram of an example of a method to create object-based audio content from a text input for use in audio books and/or audio play.

Referring to the example of FIG. 1, a flow diagram of a method for creating object-based audio content from text input for use in audio books and/or audio play is illustrated. In a first step, step 101, text input is received. The text input may be received in any conceivable way, for example, from a server, a storage medium or may be input by a user. Also, the format of the text input is not limited. The text input may be a standard text or a raw text. In an example embodiment, if the text input is a raw text, i.e., not a standard text, the raw text may be normalized. To generate standard text, for example, numbers, abbreviations and/or symbols may be converted into their equivalent of a written word. In an example embodiment, prior to performing the semantic analysis in step 102, the received text input may be syntactically analyzed. In the syntactic analysis, the structure of the text (not the underlying meaning) including the word order may be analyzed.

In step 102, the received text input is analyzed performing a semantic analysis. Details are described further below. In an example embodiment, as the one or more results of the semantic analysis, the origins of speech and effects may be identified. In an example embodiment, alternatively, or additionally, as the one or more results of the semantic analysis speech information and effects information may be determined. The speech information and the effects information may be determined relating to the one or more origins of speech and effects. In an example embodiment, as the one or more results of the semantic analysis, the speech information may further include emotional information. In a further example embodiment, alternatively, or additionally, as the one or more results of the semantic analysis, spatial information may be determined. The spatial information may be determined relating to the one or more origins of speech and effects. While determining the one or more results of the semantic analysis in step 102 is not limited according to the disclosure, in an example embodiment, at least the one or more origins of speech and effects and the spatial information may be determined as the one or more results of the semantic analysis.

In step 103, speech 103a and effects 103b are then synthesized based on the one or more results of the semantic analysis to generate one or more audio objects in this way. Details are described further below. In an example embodiment, the synthesis of speech and effects may be based on the speech information and the effects information, respectively. In an example embodiment, the one or more audio objects may be generated in relation to each of the identified origins of speech and effects. For example, one audio object may be generated for each origin. Alternatively, or additionally, two or more origins of speech and effects may be mapped to a given audio object. Metadata for the one or more audio objects are also generated in step 103c. In an example embodiment, the metadata may be generated based on the spatial information. In a further example embodiment, the metadata may be generated in relation to each of the identified origins of speech and effects.

In step 104, the object-based audio content including the one or more audio objects and the metadata is created.

In an example embodiment, the method for creating object-based audio content from text input for use in audio books and/or audio play may include the following steps. In a first step, text input may be received. In a next step, a semantic analysis of the received text input may be performed. In a next step, one or more origins of speech and effects may be identified as the one or more results of the semantic analysis. In a next step, speech information and effects information may be determined as the one or more results of the semantic analysis. In a next step, spatial information for the one or more origins of speech and effects may be determined as the one or more results of the semantic analysis. In a next step, speech and effects may be synthesized based on the speech information and the effects information to generate one or more audio objects related to the one or more origins of speech and effects. In a next step, metadata may be generated for the one or more audio objects based on the spatial information. In a next step, the object-based audio content including the one or more audio objects and the metadata may be created.

In a further example embodiment, the speech information may include emotional information and the synthesis of speech may then include the synthesis of emotional speech based on the emotional information.

Semantic Analysis

In the following, an example of the semantic analysis performed in step 102 will be described in more detail. The semantic analysis is intended to determine the underlying meaning of the received text input. In an example embodiment, as the one or more results of the semantic analysis, the origins of speech and effects may be determined. In an example embodiment, alternatively, or additionally, as the one or more results of the semantic analysis, the speech information and the effects information may be determined. The speech information and the effects information may be determined in relation to the one or more origins of speech and effects. In a further example embodiment, alternatively, or additionally, as the one or more results of the semantic analysis the spatial information may be determined. The spatial information may be determined in relation to the one or more origins of speech and effects. In an example embodiment, as the one or more results of the semantic analysis, the emotional information may be determined.

In an example embodiment, the semantic analysis may include segmentation of the received text input. Text segments may be syllables, words or sentences, paragraphs, pages or chapters for example. In some example embodiments, a syntactic analysis may be performed prior to the semantic analysis to allow simplifying the segmentation of the text based on the analyzed text structure. The size of the text segments may be adapted to the type of information to be determined. For example, to determine speech information or effects information, segmentation in the form of sentences may be performed.

Using semantic analysis, in an example embodiment the origins of speech and effects may be determined in the received text input. In an example embodiment, the origins of speech and effects may include one or more actors, a narrator, items and ambience. The methods to perform the semantic analysis are not limited. In an example embodiment, a sentiment analysis may be performed. In the sentiment analysis, keywords may be defined and the text may be analyzed based on these keywords.

Figure 2:
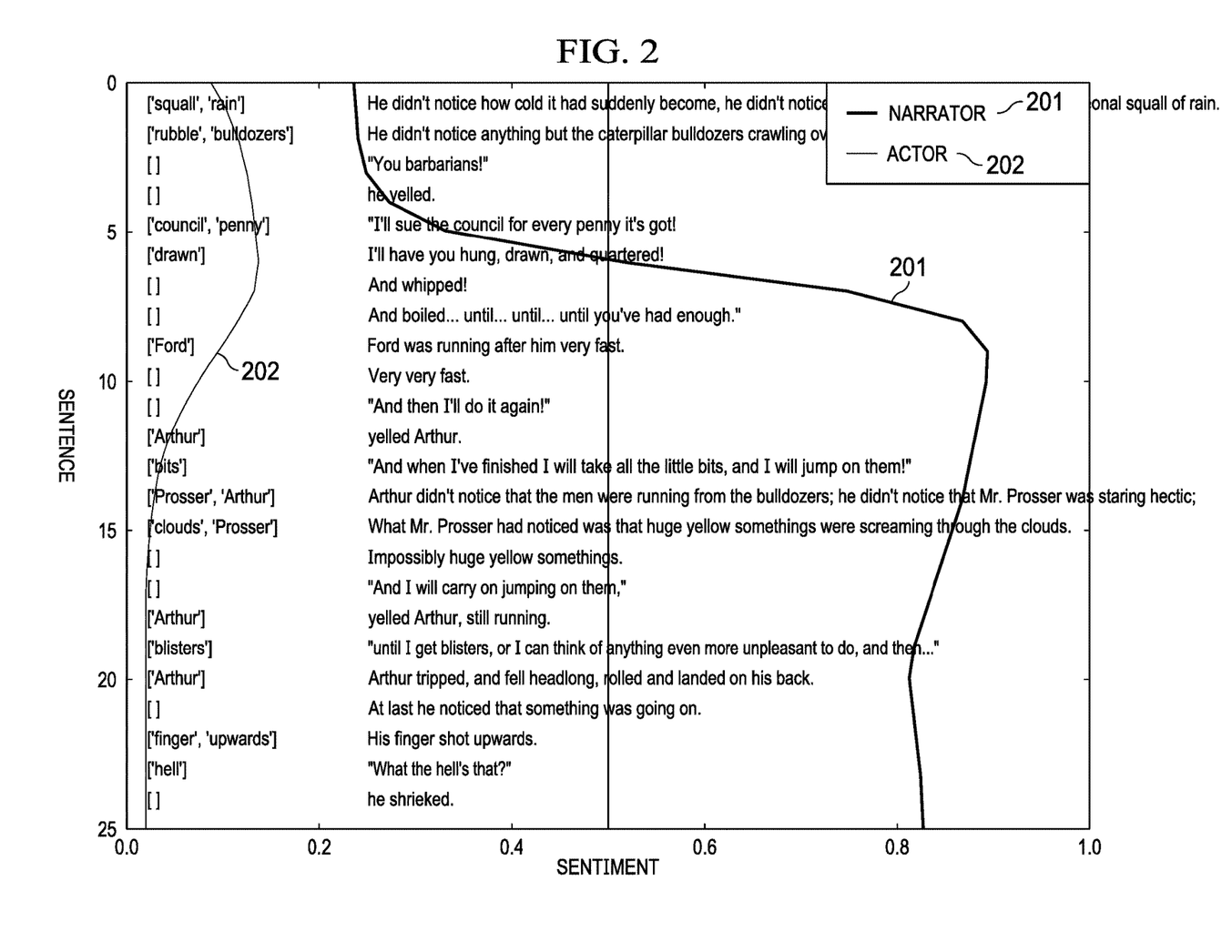
FIG. 2 illustrates an example of a semantic analysis performed on an excerpt from Hitchhikers Guide to the Galaxy.

An example for a sentiment analysis is given in FIG. 2 by means of an excerpt from Hitchhikers Guide to the Galaxy, created by Douglas Adams, first published on Oct. 12, 1979. The words in brackets correspond to keywords extracted from the respective text segments, in this case sentences, as indicated on the Y axis. The keywords may be user defined or retrieved from a database. In the latter case, the database may be created based on machine learning. Depending on the preferred genres of a user, the keyword database may thus be personalized according to the preferences of the user. The results of the sentiment analysis are shown in the form of two graphs 201, 202. A narrator 201 and an actor 202 are identified in this case as origins of speech.

Figure 3:
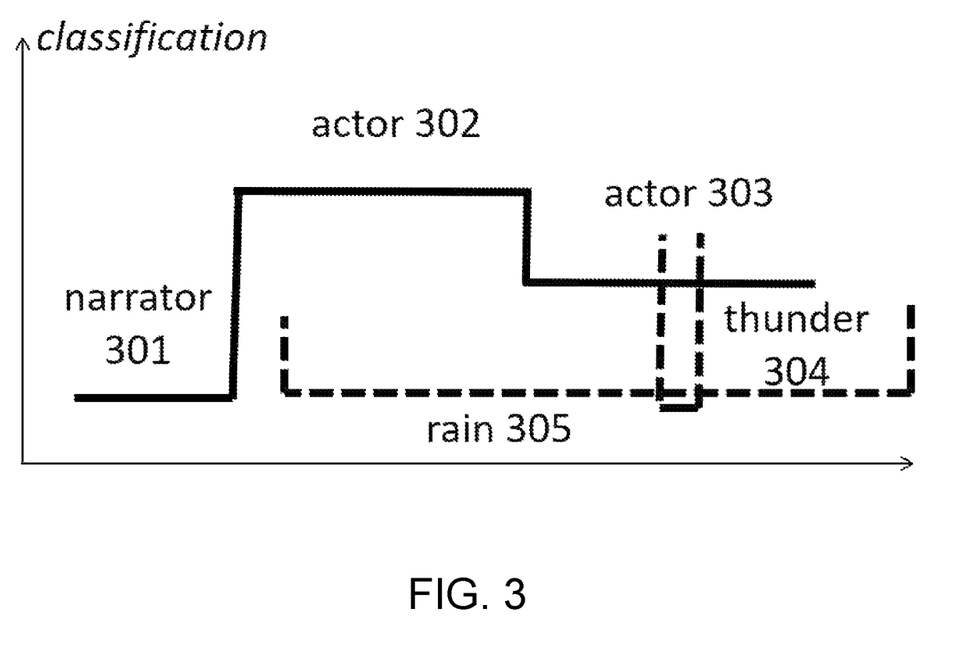
FIG. 3 illustrates schematically an example of a rule-based semantic analysis.

In an example embodiment, the sentiment analysis may be rule-based. Referring to the example of FIG. 3, a result of a rule-based analysis is illustrated schematically. The results are classified according to a narrator 301 and two actors 302, 303 as origins of speech and ambience, in this case rain 305 and thunder 304, as origin of effects.

Using semantic analysis, in an example embodiment, speech information and effects information may be determined for each of the identified origins.

In an example embodiment, the speech information may include information on one or more of name, gender, characteristics of one or more actors and background of the one or more actors. The speech information may be used to guide the synthesis of the speech in step 103.

In an example embodiment, the effects information may include information on one or more of noise, music, ambient sounds and item specific sounds. The effects information may be used to guide the synthesis of effects in step 103.

To perform the semantic analysis, a relationship between the text segments and their underlying meaning may be established. Various techniques exist that may be utilized to establish such a relationship. An example of such a technique is formal semantics, wherein the truth of a sentence and its logical relation to other sentences is evaluated relative to a model. In truth-conditional semantics a natural language sentence is associated with a meta-language description of the conditions under which it is true. The technique of conceptual semantics assumes that syntactic properties of phrases reflect the meanings of the words that head them. Lexical semantics assumes that the meaning of a word is fully reflected by its context.

Each of the above techniques may be utilized as a basis to perform the semantic analysis in step 102. The present disclosure, however, is not limited to the application of a technique in general or one of the above techniques in particular. The semantic analysis in step 102 may also be performed in any other conceivable way as long as the underlying meaning of the received text input can be determined.

Referring again to the example of FIG. 2, in this case the speech information determined may comprise for the identified actor 202 the name "Arthur", the gender "male" and may also comprise characteristics such as "resolute", for example. The term characteristics, however, may not only encompass the individual nature of an actor, but may also encompass information like optical appearance, style of clothing etc. The background of the actor 202 "Arthur" may also be determined, however, based on another part of the novel. The background of an actor may encompass information on a job or special abilities. In general, the larger the analyzed parts of the received text input are, the more refined is the determination of the speech information.

Referring to the example of FIG. 2, as origins of effects rain, bulldozers and huge yellow somethings may be identified. In this case, as an example, the effects information determined may comprise as an example of ambient sound that the rain is a squall of rain, as an example of item specific sound that the bulldozers crawl over rubble and as another example of item specific sound that the huge yellow somethings appear screaming through clouds.

In an example embodiment, the speech information may also include emotional information. The emotional information may include at least happiness, sadness, anger and neutrality. The emotional information may further include a larger number of emotions to enable a more refined determination of the emotional information and thus a more refined synthesis of emotional speech. A model such as a continuous emotion model may be used to determine the emotional information. The emotional information may be used to guide the synthesis of emotional speech. The more accurate the determination of emotions of identified actors, the more realistic the synthesis of the emotional speech. In this, a user may notice the respective emotions more easily including nuances which improves the overall listening experience.

In an example embodiment, the semantic analysis in step 102 may include natural language processing based on machine learning (for example, deep learning). The emotional information may also be determined in this way. Machine learning allows for an even deeper understanding of the meaning underlying the respective text. It is to be noted in this regard, that if the text is segmented, the size of the text segments may change during the semantic analysis in step 102. Further, not only the individual segments themselves may be analyzed. The analysis of neighboring segments may provide relevant context to determine the correct meaning of a text segment. For example, if the text segment is of the size of a single word, then the word "jump" may be regarded differently depending on its context. The sentence "I will jump on them!" may imply a different emotional state and interpretation than the context "I am jumping for joy!". While the first case may be interpreted as anger, the second case represents the opposite, i.e. happiness. The same applies for text segments of other sizes.

In an example embodiment, spatial information may be determined as the one or more results of the semantic analysis in step 102. The spatial information may be determined using natural language processing based on machine learning. This part of the semantic analysis may also include performing a number of possible subroutines which are adapted to identify the meaning of the text relating to spatial information. In an example embodiment, the spatial information may be used to generate metadata for each of the generated audio objects. In an example embodiment, an audio object may be generated for each of the identified origins of speech and effects individually. Alternatively, or additionally, origins of speech and effects may also be mapped to a single audio object, for example, if the origins are close together or for co-movement of the origins. In an example embodiment, spatial information may be determined for each of the identified origins of speech and effects. Examples of spatial information include:

Size and shape within a scene.

Position within the scene. The position can be established in one, two or three dimensions.

Coherence.

Direction of travel through the scene.

Velocity and/or acceleration through the scene.

Classification based on features associated with the activity of that item.

History or aggregated statistics of the past values of the above parameters and estimations around the scene such as the duty cycle of activity, statistics of the length of activity etc.

Referring to the example of FIG. 2, the spatial information may enable providing an immersive listening experience during playback of the audio content such as, for example, the bulldozer approaching while crawling over the rubble or the huge yellow somethings screaming from the ceiling.

Synthesis of Speech and Effects

Based on the one or more results of the semantic analysis in step 102, speech and effects are synthesized in step 103. In an example embodiment, the speech and effects may be synthesized based on the speech information and the effects information. The present disclosure is not limited to any particular technique in this regard. Speech and effects may be synthesized using state of the art text to speech techniques (TTS) or effects synthesis techniques. For effects synthesis, for example, NSynth may be used. Examples of existing TTS techniques include concatenative synthesis, sinewave synthesis, hidden Markov model (HMM)-based synthesis, formant synthesis and articulatory synthesis. In an example embodiment, unit selection synthesis may be used to synthesize the speech in step 103. To synthesize the speech and the effects, audio library databases may be accessed to select the respective audio data for synthesis.

In an example embodiment, in step 103, the speech may be synthesized for the identified origins of speech such as a narrator and one or more actors. The effects may be synthesized for the identified origins of effects such as items and ambience. In this way, audio objects may be generated for each identified origin of speech and effects individually. Alternatively, or additionally, origins of speech and effects may also be mapped to a single audio object, for example, if the origins are close together or for co-movement of the origins.

In an example embodiment, as a guide for the synthesis of speech and effects, the speech information and the effects information determined as the one or more results of the semantic analysis in step 102 may be used. In an example embodiment, the speech synthesis may include the synthesis of emotional speech guided by the emotional information.

In an example embodiment, the speech synthesis may include the synthesis of style, prosody and voice. The style may be chosen, for example, in relation to the setting of a novel, i.e., a historical setting or a science fiction setting, or, for example, in relation to a specific function of an actor such as being an anchorman.

Voice may relate to the form of articulation or expression of speech content such as talking, singing, screaming. Voice may also relate to gender. A voice may also be synthesized with regard to different tones.

With regard to prosody, the synthesis may be based on respective prosodic parameters which include:

the pitch of the voice, the length of the sounds, the loudness or prominence, the timbre, the voice quality, pausing.

For example, changing the pitch of a voice may be used to reflect the emphasis of a statement. Selective combination of these parameters may allow realizing, for example, intonation, stress, rhythm, tempo and loudness of speech. Specific intonation may be synthesized to reflect characteristics of language for example. Adjusting the pitch range may also be used, for example, in the synthesis of emotional speech to reflect excitement or fear which are located in the higher part of the pitch range. Stressed syllables may be synthesized by adjusting pitch prominence (pitch level different from that of neighboring syllables), length, loudness and timbre. Stressed syllables may be experienced as pronounced by a listener. Stressed syllables may also be used to reflect grammar and syntax in the synthesized speech which may be a tool to create characteristics or background of an actor. Also, tempo and rhythm of speech may be synthesized in this way. In the speech synthesis, also pauses may be used as a stylistic measure. Pausing may reflect breathing and thus may also be used to reflect emotions. Filled pauses may reflect hesitation. Lack of pausing may also be used to create word groupings or conglomerates of words or phrases. Lack of pausing in combination with omittance of letters or syllables may also be used to reflect a certain style of speech or a dialect.

In the synthesis of speech from text also the parsing of the text may be considered to allow the listener to recognize the syntactic structure of a text. As a stylistic measure, the combination of intonation and stress may be used to emphasize specific words or syllables to achieve an intended meaning of a sentence.

Prosodic parameters may also be used to reflect a discourse between one or more actors.

As already stated above, in an example embodiment, the synthesis of speech may include the synthesis of emotional speech. In this regard, prosody in general and the combination of prosodic parameters in particular may allow transporting emotions to a listener.

In step 103, as already stated above, besides speech also effects are synthesized. The synthesis of speech and effects may be done in parallel tracks. Specific events may be synthesized in this context such as background events or a specific scene such as a fight scene.

Metadata

In step 103, besides the synthesis of speech and effects also metadata (for example spatial metadata) for each audio object are generated. In an example embodiment, the metadata may be generated based on the spatial information determined as the one or more results of the semantic analysis in step 102. Besides spatial information, metadata may in addition be generated based on an audio object type such as speech or effect, an audio object name or identifier such as the name of an actor or the type of an effect such as rain, an analysis of the overall scene and specific speakers to output the audio object.

Object-Based Audio Content

In step 104, the object-based audio content including one or more audio objects and the respective metadata may be created (for example output). In an example embodiment, the created object-based audio content in step 104 may be encoded and distributed. This enables providing multiple representations to allow a user to select between traditional audio book and audio play with actors and effects for example. The method of encoding the object-based audio content is not limited in the present disclosure but may be determined based on the audio object type.

According to an aspect of the disclosure, the object-based audio content created in step 104 may be rendered to a channel-based format. In an example embodiment, the channel-based format includes 5.1, 7.1, 7.1.4, B-Format, Ambisonics, stereo and binaural.

The created object-based audio content in step 104 may also be imported into a Dolby Atmos content creation workflow for further mixing and rendering involving Pro-Tools and a Dolby Atmos production suite.

Rendering Object-Based Audio Content

The present disclosure is not limited to a specific method for rendering object-based audio content to a channel-based format. Any conceivable method may be applied in this regard to create an immersive listening experience.

As an example, an object and channel renderer may be used. The object and channel renderer may comprise a source panner, a ramping mixer, a speaker decorrelator, and a mixing stage. The object and channel renderer may receive the metadata, the audio data, and optionally a speaker layout of a listening environment as inputs. The object and channel renderer may output one or more speaker feeds. The Source Panner may take the metadata and may pan the sources to create speaker gains. The Ramping Mixer may mix the audio data with speaker gains to create speaker feeds. The source panner and the ramping mixer(s), and optionally the speaker decorrelator may be said to form a rendering unit.

Interpretation

Unless specifically stated otherwise, as apparent from the following discussions, it is appreciated that throughout the disclosure discussions utilizing terms such as "processing," "computing," "calculating," "determining", analyzing" or the like, refer to the action and/or processes of a computer or computing system, or similar electronic computing devices, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one example embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The processing system may also encompass a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one or more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code. Furthermore, a computer-readable carrier medium may form, or be included in a computer program product.

In alternative example embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a Personal Digital Assistant (PDA), a cellular telephone, a web appliance, a network router, switch or bridge, or any machine capable of executing a set of instructions (sequential or otherwise) that specify actions to be taken by that machine.

Note that the term "machine" shall also be taken to include any collection of machines that individually or jointly execute a set (or multiple sets) of instructions to perform any one or more of the methodologies discussed herein.

Thus, one example embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, example embodiments of the present disclosure may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present disclosure may take the form of a method, an entirely hardware example embodiment, an entirely software example embodiment or an example embodiment combining software and hardware aspects. Furthermore, the present disclosure may take the form of carrier medium (e.g., a computer program product on a computer-readable storage medium) carrying computer-readable program code embodied in the medium.

The software may further be transmitted or received over a network via a network interface device. While the carrier medium is in an example embodiment a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present disclosure. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media may also take the form of acoustic or light waves, such as those generated during radio wave and infrared data communications.

For example, the term "carrier medium" shall accordingly be taken to include, but not be limited to, solid-state memories, a computer product embodied in optical and magnetic media; a medium bearing a propagated signal detectable by at least one processor or one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one example embodiment by an appropriate processor (or processors) of a processing (e.g., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Reference throughout this disclosure to "one example embodiment", "some example embodiments" or "an example embodiment" means that a particular feature, structure or characteristic described in connection with the example embodiment is included in at least one example embodiment of the present disclosure. Thus, appearances of the phrases "in one example embodiment", "in some example embodiments" or "in an example embodiment" in various places throughout this disclosure are not necessarily all referring to the same example embodiment. Furthermore, the particular features, structures or characteristics may be combined in any suitable manner, as would be apparent to one of ordinary skill in the art from this disclosure, in one or more example embodiments.

As used herein, unless otherwise specified the use of the ordinal adjectives "first", "second", "third", etc., to describe a common object, merely indicate that different instances of like objects are being referred to and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of example embodiments of the disclosure, various features of the disclosure are sometimes grouped together in a single example embodiment, Fig., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed example embodiment. Thus, the claims following the Description are hereby expressly incorporated into this Description, with each claim standing on its own as a separate example embodiment of this disclosure.

Furthermore, while some example embodiments described herein include some but not other features included in other example embodiments, combinations of features of different example embodiments are meant to be within the scope of the disclosure, and form different example embodiments, as would be understood by those skilled in the art. For example, in the following claims, any of the claimed example embodiments can be used in any combination.

In the description provided herein, numerous specific details are set forth. However, it is understood that example embodiments of the disclosure may be practiced without these specific details. In other instances, well-known methods, structures and techniques have not been shown in detail in order not to obscure an understanding of this description.

Thus, while there has been described what are believed to be the best modes of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

Various aspects of the present invention may be appreciated from the following enumerated example embodiments (EEEs):

1. A method for creating object-based audio content from a text input for use in audio books and/or audio play, the method including the steps of:
   a) receiving the text input;
   b) performing a semantic analysis of the received text input;
   c) synthesizing speech and effects based on one or more results of the semantic analysis to generate one or more audio objects;
   d) generating metadata for the one or more audio objects; and
   e) creating the object-based audio content including the one or more audio objects and the metadata.

2. The method according to EEE 1, wherein the method further includes the step: bi) identifying one or more origins of speech and effects as the one or more results of the semantic analysis.

3. The method according to EEE 2, wherein the origins of speech and effects include one or more of actors, a narrator, items and ambience.

4. The method according to any of EEEs 1-3, wherein the method further includes the step: bii) determining speech information and/or effects information as the one or more results of the semantic analysis.

5. The method according to EEE 4, wherein the speech information includes information on one or more of name, gender, characteristics of one or more actors and background of the one or more actors.

6. The method according to EEE 4 or EEE 5, wherein the speech information further includes emotional information as the one or more results of the semantic analysis.

7. The method according to EEE 6, wherein the emotional information includes at least information on happiness, neutrality, anger and sadness.

8. The method according to any of EEEs 4-7, wherein the effects information includes information on one or more of noise, music, ambient sounds and item specific sounds.

9. The method according to any of EEEs 1-8, wherein the method further includes the step: biii) determining spatial information as the one or more results of the semantic.

10. The method according to EEE 9, wherein the spatial information includes information on one or more of direction of travel, velocity, size, shape, position, coherence or acceleration.

11. The method according to any of EEEs 1-10, wherein the method further includes the step: ai) normalizing the received text input.

12. The method according to any of EEEs 1-11, wherein the method further includes the step: aii) performing a syntactic analysis of the received text input.

13. The method according to any of EEEs 1-12, wherein the semantic analysis includes segmentation of the received text input.

14. The method according to any of EEEs 1-13, wherein the semantic analysis includes a sentiment analysis.

15. The method according to EEE 14, wherein the sentiment analysis is rule-based.

16. The method according to any of EEEs 1-15, wherein the semantic analysis includes natural language processing with machine learning.

17. The method according to any of EEEs 1-16, wherein the speech is synthesized using text to speech synthesis.

18. The method according to EEE 17, wherein the text to speech synthesis includes unit selection speech synthesis.

19. The method according to any of EEEs 1-18, wherein the speech synthesis includes the synthesis of one or more of style, prosody and voice.

20. The method according to any of EEEs 1-19, wherein the speech synthesis includes the synthesis of emotional speech.

21. The method according to any of EEEs 1-20, wherein the method further includes introducing additional recordings and/or effects.

22. The method according to any of EEEs 1-21, wherein the method further includes the step: f) encoding the object-based audio content.

23. A method for creating object-based audio content from a text input for use in audio books and/or audio play, the method including the steps of:
   a) receiving the text input;
   b) performing a semantic analysis of the received text input;
   c) synthesizing speech and effects based on one or more results of the semantic analysis to generate one or more audio objects;
   d) generating metadata for the one or more audio objects;
   e) creating the object-based audio content including the one or more audio objects and the metadata; and
   f) rendering the object-based audio content to a channel-based format.

24. The method according to EEE 23, wherein the method further includes the step: bi) identifying one or more origins of speech and effects as the one or more results of the semantic analysis.

25. The method according to EEE 23 or EEE 24, wherein the method further includes the step: bii) determining speech information and effects information as the one or more results of the semantic analysis.

26. The method according to any of EEEs 23-25, wherein the method further includes the step: biii) determining spatial information as the one or more results of the semantic analysis.

27. The method according to any of EEEs 23-26, wherein the channel-based format includes 5.1, 7.1, 7.1.4, B-Format, Ambisonics, stereo and binaural.

28. The method according to any of EEEs 23-27, wherein the method further includes the step: ai) normalizing the received text input.

29. The method according to any of EEEs 23-28, wherein the method further includes the step: aii) performing a syntactic analysis of the received text input.

30. The method according to any of EEEs 23-29, wherein the method further includes introducing additional recordings and/or effects.

31. A computer-based system including one or more processors configured to perform the method according to any of EEEs 1-22.

32. The computer-based system according to EEE 31 including a user interface to facilitate the selection of text input.

33. A computer-based system including one or more processors configured to perform the method according to any of EEEs 23-30.

34. The computer-based system according to EEE 33 including a user interface to facilitate the selection of text input.

35. A computer program product comprising a computer-readable storage medium with instructions adapted to carry out the method according to any of EEEs 1-22 when executed by a device having processing capability.

36. A computer program product comprising a computer-readable storage medium with instructions adapted to carry out the method according to any of EEEs 23-30 when executed by a device having processing capability.

The invention claimed is:

1. A method for creating object-based audio content from a text input for use in audio books and/or audio play, the method including the steps of:
   a) receiving the text input;
   b) performing a semantic analysis of the received text input;
   bi) determining spatial information as one or more results of the semantic analysis;
   c) synthesizing speech and effects based on the one or more results of the semantic analysis to generate one or more audio objects;
   d) generating metadata for the one or more audio objects; and e) creating the object-based audio content including the one or more audio objects and the metadata.

2. The method according to claim 1, wherein the method further includes the step: bii) identifying one or more origins of speech and effects as the one or more results of the semantic analysis.

3. The method according to claim 2, wherein the origins of speech and effects include one or more of actors, a narrator, items and ambience.

4. The method according to claim 2, wherein the spatial information is determined for the one or more origins of speech and effects.

5. The method according to claim 1, wherein the spatial information includes information on one or more of direction of travel, velocity, size, shape, position, coherence or acceleration.

6. The method according to claim 1, wherein the method further includes the step: aii) performing a syntactic analysis of the received text input.

7. The method according to claim 1, wherein the semantic analysis includes segmentation of the received text input.

8. The method according to claim 1, wherein the speech is synthesized using text to speech synthesis.

9. The method according to claim 8, wherein the text to speech synthesis includes unit selection speech synthesis.

10. The method according to claim 1, wherein the speech synthesis includes the synthesis of one or more of style, prosody and voice.

11. The method according to claim 1, wherein the method further includes the step of:
    f) rendering the object-based audio content to a channel-based format.

12. The method according to claim 11, wherein the channel-based format includes at least one of 5.1, 7.1, 7.1.4, B-Format, Ambisonics, stereo, or binaural.

13. A computer-based system including one or more processors configured to perform the method according to claim 1.

14. The computer-based system according to claim 13 including a user interface to facilitate the selection of text input.

15. A computer program product comprising a non-transitory computer-readable storage medium with instructions adapted to carry out the method according to claim 1 when executed by a device having processing capability.

* * * * *

UNITED STATES PATENT AND TRADEMARK OFFICE
CERTIFICATE OF CORRECTION

| | | |
|---|---|---|
| PATENT NO. | : 11,195,511 B2 | Page 1 of 1 |
| APPLICATION NO. | : 17/260569 | |
| DATED | : December 7, 2021 | |
| INVENTOR(S) | : Toni Hirvonen et al. | |

It is certified that error appears in the above-identified patent and that said Letters Patent is hereby corrected as shown below:

On the Title Page

Item [30], Line 1, Delete "ES201830728" and insert --P201830728-- therefor.

Item [30], Line 2, Delete "8201444" and insert --18201444-- therefor.

Signed and Sealed this
Tenth Day of September, 2024

Katherine Kelly Vidal
*Director of the United States Patent and Trademark Office*